(12) United States Patent
Kares

(10) Patent No.: US 9,702,299 B2
(45) Date of Patent: Jul. 11, 2017

(54) TURBINE ASSEMBLY

(71) Applicant: Honeywell International Inc., Morristown, NJ (US)

(72) Inventor: Vaclav Kares, Strakonice (CZ)

(73) Assignee: Honeywell International Inc., Morris Plains, NJ (US)

( * ) Notice: Subject to any disclaimer, the term of this patent is extended or adjusted under 35 U.S.C. 154(b) by 722 days.

(21) Appl. No.: 14/101,301

(22) Filed: Dec. 9, 2013

(65) Prior Publication Data

US 2014/0178217 A1 Jun. 26, 2014

Related U.S. Application Data

(60) Provisional application No. 61/745,872, filed on Dec. 26, 2012.

(51) Int. Cl.
| | |
|---|---|
| *F01D 5/04* | (2006.01) |
| *F02B 37/22* | (2006.01) |
| *F01D 17/16* | (2006.01) |

(52) U.S. Cl.
CPC .............. *F02B 37/22* (2013.01); *F01D 5/048* (2013.01); *F01D 17/165* (2013.01); *F05D 2220/40* (2013.01); *F05D 2250/611* (2013.01)

(58) Field of Classification Search
CPC ........ F02B 37/22; F01D 5/048; F01D 17/165; F05D 2250/611; F05D 2220/40
See application file for complete search history.

(56) References Cited

U.S. PATENT DOCUMENTS

| | | | |
|---|---|---|---|
| 4,179,247 A * | 12/1979 | Osborn ................ | F01D 17/165 384/518 |
| 6,742,989 B2 | 6/2004 | Osako et al. | |
| 6,877,955 B2 | 4/2005 | Higashimori et al. | |
| 7,802,429 B2 * | 9/2010 | Yokoyama ............ | F01D 9/026 60/605.1 |
| 2007/0089414 A1* | 4/2007 | Yokoyama ............ | F01D 9/026 60/605.1 |
| 2009/0290980 A1* | 11/2009 | Higashimori ......... | F01D 17/148 415/205 |
| 2012/0237343 A1* | 9/2012 | Matsuyama .......... | F01D 17/165 415/182.1 |
| 2013/0121820 A1* | 5/2013 | Yoshida ................ | F01D 9/026 415/205 |

FOREIGN PATENT DOCUMENTS

| | | |
|---|---|---|
| DE | 4411678 A1 | 10/1995 |
| JP | 1993340265 A | 12/1993 |
| SU | 373438 A1 | 7/1973 |

\* cited by examiner

*Primary Examiner* — Craig Kim
*Assistant Examiner* — Eldon Brockman
(74) *Attorney, Agent, or Firm* — Brian J. Pangrle

(57) ABSTRACT

An assembly for a turbocharger can include a pinched nozzle cartridge that includes a base component, an insert component and vanes disposed at least in part between the base component and the insert component, where the insert component includes a shroud surface and an upper pinch profile, where the base component includes an annular surface that defines a turbine wheel opening and a lower profile and where the upper pinch profile and the lower profile form a pinched nozzle. Various other examples of devices, assemblies, systems, methods, etc., are also disclosed.

18 Claims, 8 Drawing Sheets

TURBINE ASSEMBLY

RELATED APPLICATIONS

This application claims the benefit of U.S. Provisional Application Ser. No. 61/745,872, filed 26 Dec. 2012, which is incorporated by reference herein.

TECHNICAL FIELD

Subject matter disclosed herein relates generally to turbine assemblies for turbomachinery such as turbochargers for internal combustion engines.

BACKGROUND

A turbocharger can extract energy from exhaust of an internal combustion engine using a turbine wheel. During operation, conditions may vary over time that can impact performance of the turbocharger. For example, a turbine wheel designed for high-energy (e.g., high flow) conditions may operate with less efficiency for low-energy (e.g., low flow) conditions. Various technologies, techniques, etc., described herein relate to turbine assemblies that may enhance efficiency for low-energy (e.g., low flow) conditions.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
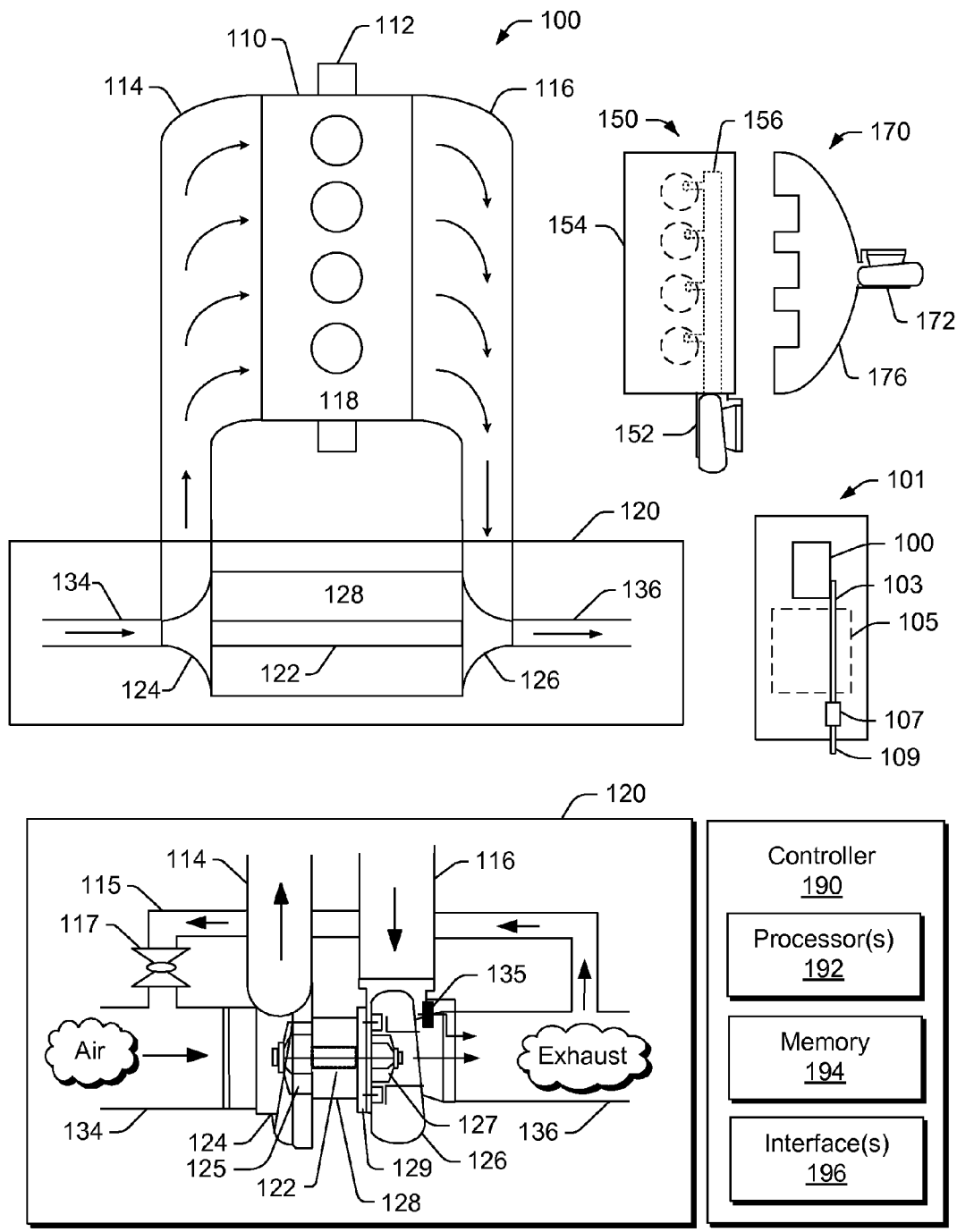
FIG. 1 is a diagram of examples of a turbocharger, an internal combustion engine, and various equipment.

Turbochargers are frequently utilized to increase output of an internal combustion engine. Referring to FIG. 1, an example of a turbocharged system 100 includes an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

In the example of FIG. 1, the internal combustion engine 110 includes an engine block 118 housing one or more combustion chambers that operatively drive a shaft 112 (e.g., via pistons). As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136, which, for example, may be in fluid communication with the exhaust conduit 103 of the vehicle 101. The housing assembly 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry mechanism 129 is shown as being, in part, disposed between the housing assembly 128 and the housing assembly 126. Such a variable geometry mechanism may include vanes or other components to vary geometry of passages that lead to a turbine wheel space in the turbine housing assembly 126. As an example, a variable geometry compressor mechanism may be provided.

In the example of FIG. 1, a wastegate valve (or simply wastegate) 135 is positioned proximate to an exhaust inlet of the turbine housing assembly 126 (e.g., upstream of the turbine wheel 127). The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc.

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1 an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, pressure, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, pressure, a variable geometry mechanism (e.g., variable geometry compressor or turbine), a wastegate (e.g., via an actuator), an electric motor, or one or more other components associated with an engine, a turbocharger (or turbochargers), etc. As an example, the controller 190 may include instructions stored in the memory 194 executable by at least one of the one or more processors 192 for controlling a turbocharger.

Figure 2:
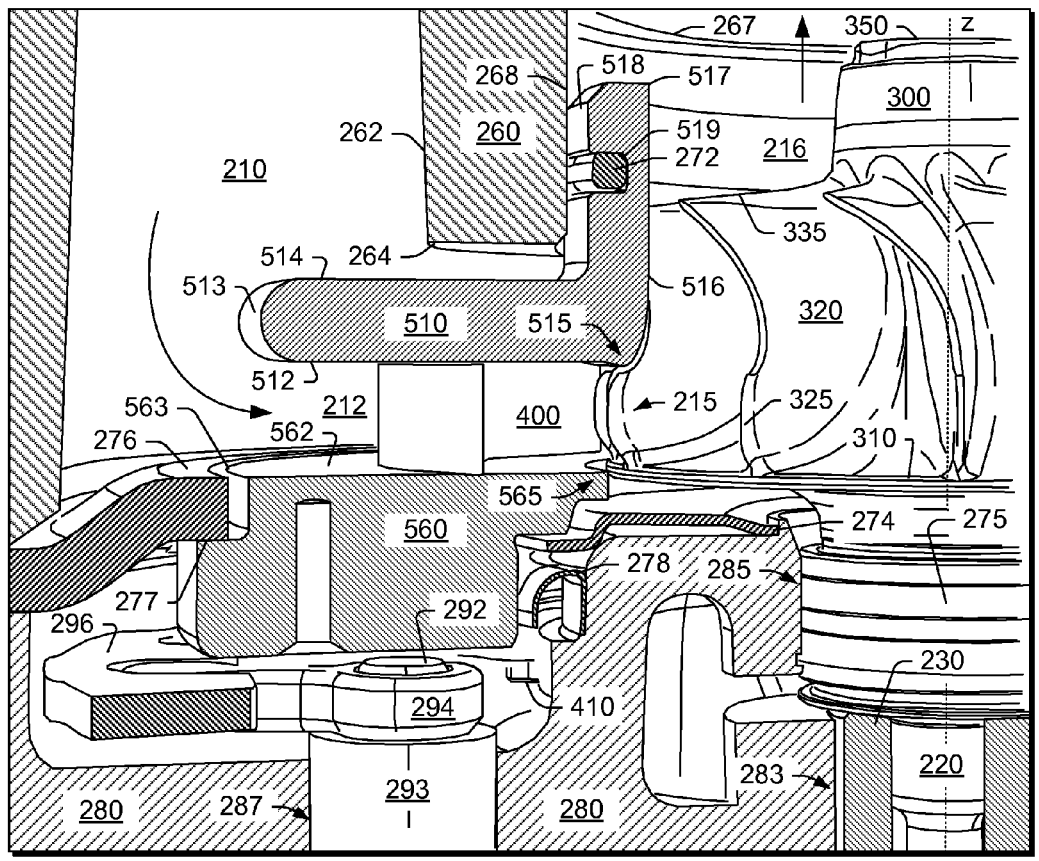
FIG. 2 is a cutaway view of an example of a turbine assembly that includes a variable geometry mechanism.

FIG. 2 shows a cutaway view of an example of an assembly 200 that includes a turbine wheel 300, a vane 400 and a pinched nozzle cartridge 500 formed in part by an insert component 510 and a base component 560. A z-axis is shown as being a rotational axis for the turbine wheel 300; noting that a cylindrical coordinate system (e.g., r, z, Θ) may be used to describe various components, features, etc., of the assembly 200.

In the example of FIG. 2, the turbine wheel 300 is attached to a shaft 220, for example, to form a shaft and wheel assembly (SWA). As shown, the shaft 220 is rotatably supported by a bearing 230 disposed in a bearing bore defined by a bearing bore surface 283 of a center housing 280. The turbine wheel 300 can include a grooved portion for seating one or more seals 275 (e.g., O-rings, piston rings, etc.) that act to form a sealed passage with respect to a seal surface 285 of the center housing 280. For example, the sealed passage may hinder flow of exhaust toward the bearing 230 and may hinder flow of lubricant toward the turbine wheel 300.

In the example of FIG. 2, the turbine wheel 300 includes a hub that extends axially between a base plate 310 and a nose 350 from which blades 320 extend radially outwardly. Each of the blades 320 includes an inducer edge 325 and an exducer edge 335. For each of the blades 320, the inducer edge 325 may be referred to as a leading edge whereas the exducer edge 335 may be referred to as a trailing edge (e.g., referenced with respect to a general direction of exhaust flow).

In the example of FIG. 2, the vane 400 and the pinched nozzle cartridge 500 can cooperate to direct exhaust to the turbine wheel 300. As shown, exhaust can flow in the assembly 200 from a volute 210 to a nozzle section 212 to a nozzle 215 and to the turbine wheel 300 as disposed, at least in part, in a wheel space 216 (e.g., to rotate the turbine wheel 300). As an example, during operation, exhaust pressure in the volute 210 can exceed ambient pressure (e.g., downstream from the wheel space 216). In a simplified manner, reduction in exhaust pressure can occur as exhaust passes from the volute 210 to the wheel space 216 where the turbine wheel 300 may "capture" energy from such reduction (e.g., as the exhaust expands in volume), for example, for purposes of rotating the shaft 220 to drive a wheel of a compressor. In the example of FIG. 2, the turbine wheel 300, the vane 400 and the pinched nozzle cartridge 500 can cooperate to provide for more efficient operation of the assembly 200, for example, by improving angle of incidence of exhaust flowing from the nozzle 215 of the pinched nozzle cartridge 500 to the turbine wheel 300, especially under low flow conditions (e.g., low energy conditions).

As shown in the example of FIG. 2, the volute 210 is defined in part by a surface 262 of a turbine housing component 260 that is attached to the center housing 280 to securely position a substantially rigid annular disc 276 having a locating surface 277 that locates the base component 560, which is biased by a flexible annular disc 274 (e.g., a spring-disc) positioned with respect to the center housing 280 (e.g., about a through bore of the center housing 280). Posts (not shown) extend from the base component 560 to the insert component 510 to define the nozzle section 212 as well as the nozzle 215. As shown, the vane 400 is positioned in the nozzle section 212 where orientation of the vane 400 may be controlled via a variable geometry mechanism.

In the example of FIG. 2, the insert component 510 has a substantially L-shaped cross-sectional profile with a substantially radial leg that extends from the volute 210 along the nozzle section 212 that, at the nozzle 215, joins an axial leg that defines, at least in part, the wheel space 216. In the example of FIG. 2, the insert component 510 may be defined as including an annular disc portion (e.g., radial extension) and a cylindrical wall portion (e.g., axial extension). As shown, the insert component 510 can include a nozzle section surface 512 that extends between a volute end 513 and a nozzle profile 515 (e.g., a pinch profile) that extends to a wheel space surface 516 and the base component 560 can include an opposing nozzle section surface 562 that also extends between a volute end 563 and a nozzle profile 565 (e.g., to thereby define the nozzle section 212 and the nozzle 215).

As shown in the example of FIG. 2, the wheel space surface 516 of the insert component 510 extends from the nozzle profile 515 to an edge 517 that defines an opening for the wheel space 216 (e.g., for flow to an opening defined by an edge 267 of the turbine housing component 260). From the edge 517, the insert component 510 extends substantially radially outwardly to a locating surface 518 that extends axially downwardly and that includes a groove 519 to seat a seal component 272 that forms a seal with a surface 268 of the turbine housing component 260. As shown, the locating surface 518 extends to a shoulder that meets a substantially planar surface 514 that extends radially outwardly to the volute end 513 of the insert component 510. In the example of FIG. 2, the insert component 510 may be defined as having a "hat" shape, for example, with a brim and a crown (e.g., open at the top).

As mentioned, orientation of the vane 400 may be controlled via a variable geometry mechanism. In the example of FIG. 2, the base component 560 includes an opening to receive a post 410 of the vane 400. The vane 400 may be pivoted about the post 410 to thereby alter its orientation in the nozzle section 212. For example, a control shaft 292, supported by a bushing 293 in a control bore defined by a control bore surface 287 of the center housing 280, may be connected to a control arm 294 that cooperates with a unison ring 296. In such an example, rotation of the control shaft 292 causes rotation of the unison ring 296 and rotation of the post 410 to thereby pivotably orient the vane 400 in the nozzle section 212. As the assembly 200 can include a plurality of vanes, such as the vane 400, pivoting of the vanes can cause changes to shapes of throats defined by surfaces of adjacent vanes. Changes in the shapes of the throats can alter flow, for example, direction of flow, resistance to flow, etc. A controller such as the controller 190 of FIG. 1 may act to control vane orientation via a variable geometry mechanism, for example, dependent on one or more operational conditions (e.g., demand, exhaust flow, temperature, pressure, etc.).

As an example, an axial height difference between an axial height of the nozzle section 212 and an axial height of the nozzle 215 may be about 10% or more of the axial height of the nozzle section 212. For example, the axial height of the nozzle section 212 may be about 6.5 mm while the axial height of the nozzle 215 may be about 5.5 mm. In such an example, an ability to have an increased axial height in the nozzle section 212 may act to decrease energy loss due to presence of vanes such as the vane 400.

In the example of FIG. 2, the nozzle 215, as pinched compared to the nozzle section 212, can alter a radial velocity component of exhaust flow at a location proximate to the turbine wheel 300; noting that a tangential velocity component of exhaust flow may be dictated by, for example, a "free swirl" condition. In such an example, the assembly 200 may achieve better incidence at the turbine wheel 300 (at its inducer portion) for low volumetric or mass flows of exhaust. The pinched nozzle cartridge 500 provides a transition region, for example, that transitions from the axial height of the nozzle section 212 where the vane 400 is located, to the nozzle 215 (e.g., as pinched), which in conjunction with a particular shape of the inducer portion of the turbine wheel 300 (see, e.g., the inducer edge 325), provides for smoother flow of exhaust from the nozzle section 212 to the turbine wheel 300.

In the example of FIG. 2, three blocks are shown for the turbine wheel 300, the vane 400 and the pinched nozzle cartridge 500 that include, for example, references to figures described herein.

As an example, an assembly can include a pinched nozzle cartridge that includes an insert component with a shroud surface and an upper pinch profile and a base component with an annular surface that defines a turbine wheel opening and a lower pinch profile where the pinch profiles form a pinched nozzle; and a turbine wheel that includes a rotational axis, a hub and blades where each of the blades includes a shroud edge and an inducer edge defined between an upper axial point and a lower axial point and where the upper pinch profile includes a downward angle directed at the upper axial point of the inducer edge and the lower pinch profile includes an upward angle directed at the lower axial point of the inducer edge.

Figure 3:
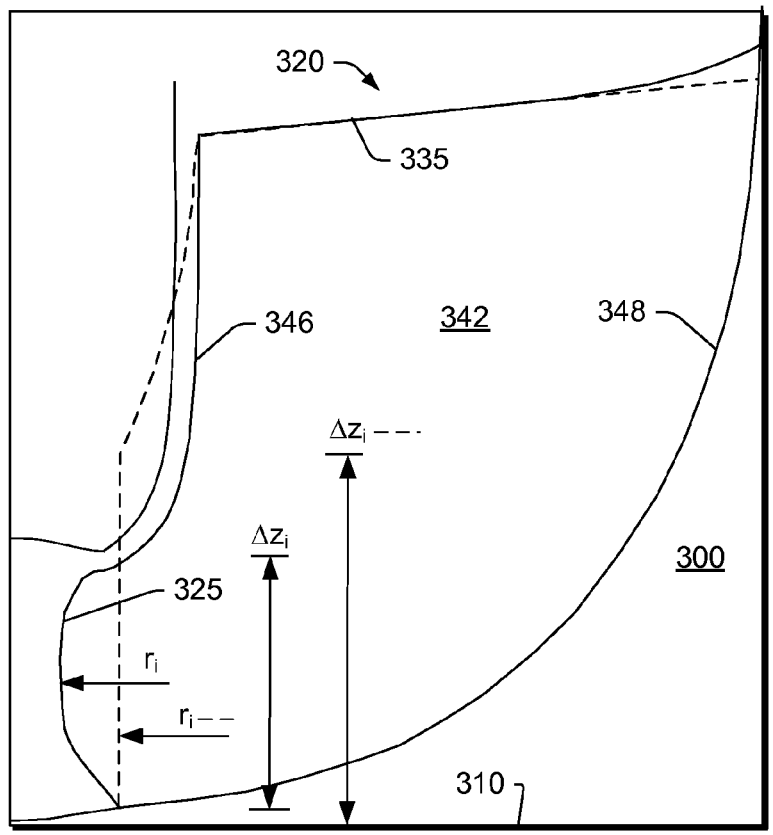
FIG. 3 is a series of views of an example of a turbine wheel.
Figure 3:
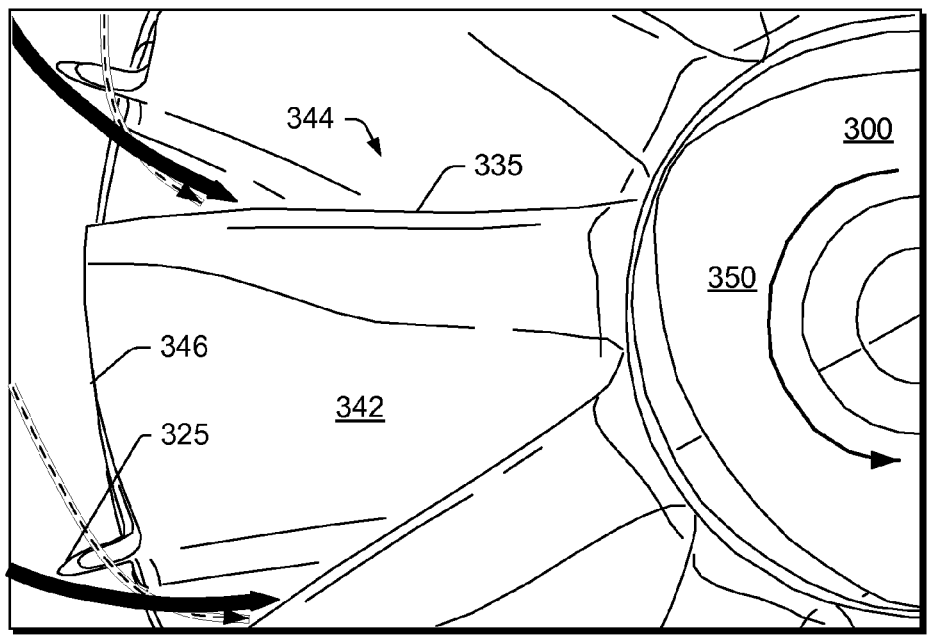

FIG. 3 shows a side view and a plan view of an example of the turbine wheel 300. In the side view, the blade 320 is shown with respect to a dashed line. As shown, the blade 320 differs at the inducer edge 325 and optionally at the exducer edge 335. As to the inducer edge 325, it extends radially outwardly ($r_i$) and may include a lesser axial height ($\Delta z_i$) than would an inducer edge of a blade as indicated by the dashed line. In such a manner, efficiency of the turbine wheel 300 may be improved at its inducer edge 325 (e.g., leading edge of the blade 320). As to the exducer edge 335, it extends axially upwardly as it approaches the hub of the turbine wheel 300; compared to an exducer edge of a blade as indicated by the dashed line. In such a manner, stress may be decreased at the exducer edge 335 (e.g., trailing edge of the blade 320).

In the example of FIG. 3, also shown is a shroud edge 346 and a hub edge 348 as well as a blade surface 342, which has an opposite surface 344. Accordingly, the blade 320 may be defined by its edges 325, 346, 335 and 348 as well as its surfaces 342 and 344. As to the base plate 310, which may also be referred to as a back plate, its shape, dimensions, etc., may be selected as appropriate. For example, the base plate 310 may extend radially to a lowermost axial position of the inducer edge 325 or it may extend radially past the lowermost axial position of the inducer edge 325.

In the plan view, the turbine wheel 300 is shown along with arrows, two of which represent a general direction of flow from a nozzle to each of the blades 320 and another of which indicates an intended direction of rotation of the turbine wheel 300. Of the two arrows, one arrow with a dashed line indicates a general direction of flow for a blade having a blade profile as indicated by the dashed lines in the side view while the other arrow with a solid line indicates a general direction of flow for the blade 320 that includes the inducer edge 325. As shown, with the inducer edge 325, the flow follows a less "curved" path from a nozzle to the blade 320. In the example of FIG. 3, the surfaces 342 and 344 may be referred to as suction and pressure surfaces, respectively (e.g., suction surface 342 and pressure surface 344). As shown, the blade 320 may be scalloped where its suction surface 342 may be substantially convex and where its pressure surface 344 may be substantially concave; and the suction surface 342 and the pressure surface 344 may extend to the inducer edge 325. Further, as indicated, the blade 320 has a blade thickness that may vary with respect to position on the blade 320 (e.g., position with respect to a radius, the rotational axis, a camberline, etc.).

Figure 4:
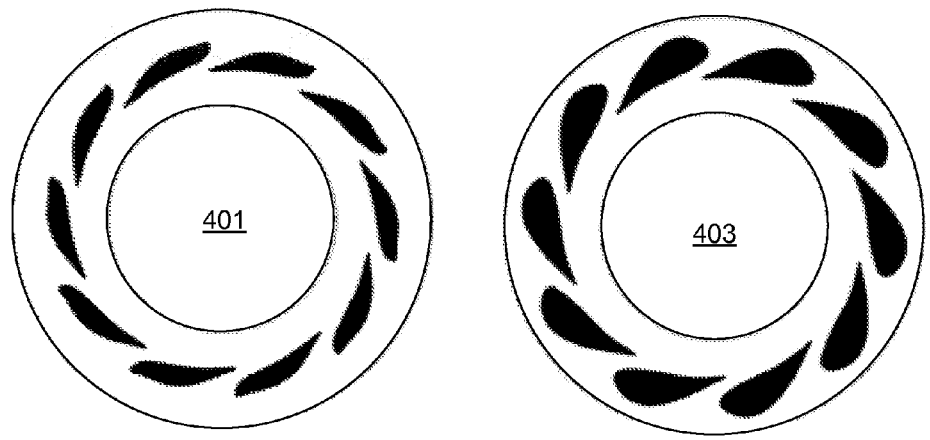
FIG. 4 is a series of views of examples of vanes including a perspective view of an example that includes a plot of a flow characteristic.
Figure 4:
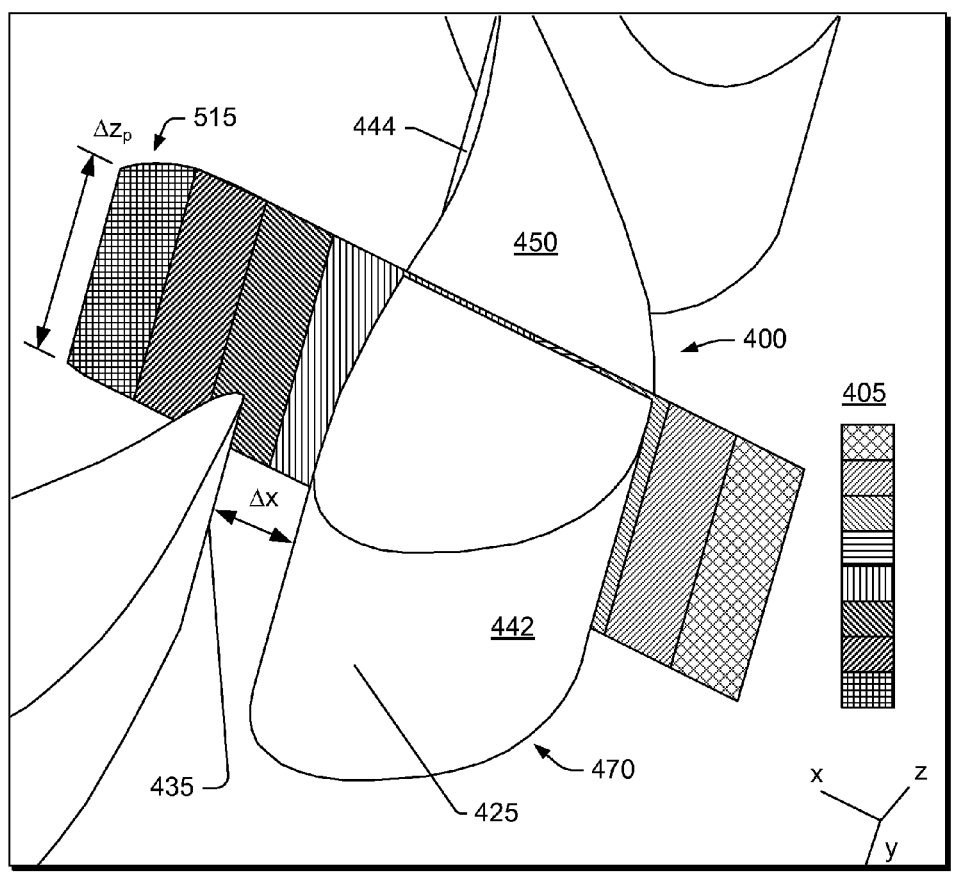

FIG. 4 shows top views of examples of vanes 401 and 403 and a perspective view of an example of the vane 400 along with a plot 405 of a flow characteristic (e.g., with respect to a Cartesian x, y, z coordinate system).

As an example, an assembly such as the assembly 200 of FIG. 2 may include vanes 401, vanes 403 or other vanes. As shown in the perspective view, the vane 400 includes a leading edge 425 and a trailing edge 435; a suction surface 442 and a pressure surface 444; a top surface 450 and a bottom surface 470. With respect to the pinched nozzle cartridge 500, the bottom surface 470 may contact the surface 562 of the base component 560 while an axial gap may exist between the top surface 450 and the surface 512 of the insert component 510; thus, in the plot 405, data are shown as extending across the top surface 450 of the vane 400. As an example, a wider vane may act to create more resistance to flow across a top surface of a vane, which, in turn, may act to direct more flow via throats formed between pressure and suction surfaces of adjacent vanes. As shown, the plot 405 includes a top edge and a bottom edge that represent a nozzle pinch height (e.g., $\Delta z_p$).

In the example of FIG. 4, for the orientation shown, a throat may be defined as having a throat width $\Delta x$. A change in vane orientation (e.g., via pivoting) may change throat width, shape, etc. As an example, a change in vane orientation may change a velocity component or components of exhaust flowing through throats and thereby change angle of incidence with respect to an inducer edge of a blade of a turbine wheel. As an example, alteration of vane orientation may alter distance between trailing edges of vanes and a nozzle. For example, in FIG. 4, counterclockwise pivoting may cause the trailing edge 435 to move closer to the nozzle pinch (see, e.g., $\Delta z_p$) and the leading edge 425 to move away from the nozzle pinch (see, e.g., $\Delta z_p$). Accordingly, flow characteristics may change for a turbine assembly in a manner dependent on vane orientation.

In the example of FIG. 4, the plot 405 includes a shape or profile that accounts for a pinch profile such as, for example, the pinch profile 515 (e.g., and/or the pinch profile 565). FIG. 4 provides a perspective as to approximate vane position with respect to a pinch. In such an example, the trailing edges 435 may move closer to the pinch profile 515 and, for example, each vane may include one or more tapers or chamfers (see, e.g., the vane 852 of FIG. 8) to allow the vanes to move into a pinch profile region (e.g., without contacting a surface or surfaces of a cartridge, which may cause sticking, friction, impact controllability, etc.).

As an example, a vane may have a "chubby" shape (see, e.g., the vanes 403). As an example, a vane may include robust tip labyrinth sealing features and/or an integrated spacer inside a vane (e.g., approximately 3 mm spacer diameter). As an example, an assembly may include labyrinth sealing features, grooves, etc. (e.g., on one or more components), for example, at a location or locations where vanes may be closed (e.g., optionally to provide clearances, reduced surface area, etc.). As an example, an assembly may be configured for approximately 40 degrees of vane rotation. As an example, a vane may have an axial vane height of about 6.5 mm and a pinched nozzle may have an axial height of about 5.5 mm, which may act to decrease vane losses.

Figure 5:
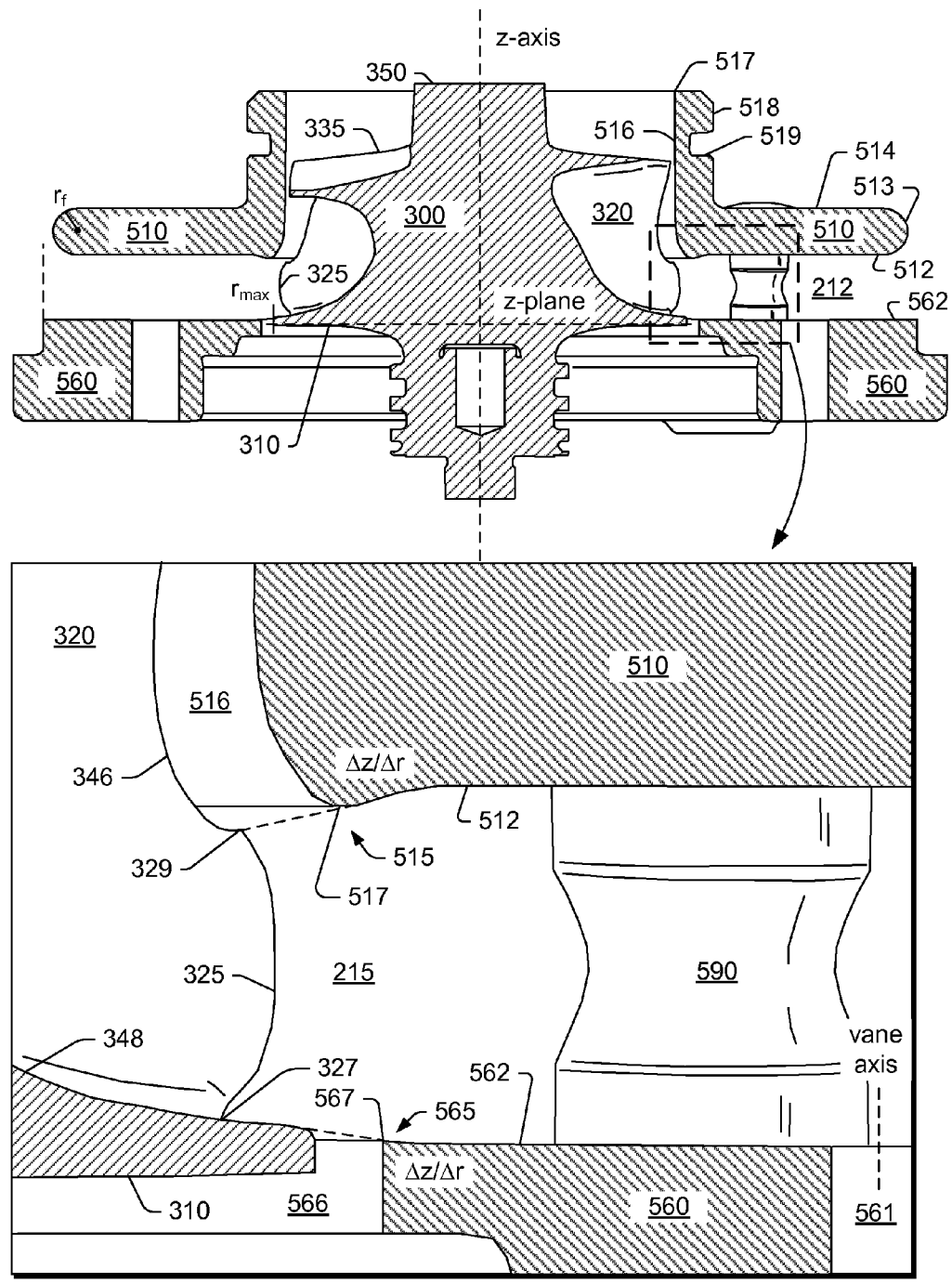
FIG. 5 is a cutaway view of an example of an assembly that includes a turbine wheel and a pinched nozzle cartridge.

FIG. 5 shows a cutaway view of an example of an assembly that includes the turbine wheel 300 and the pinched nozzle cartridge 500. As shown in an enlarged view, via dashed lines, the pinch profile 515 of the insert component 510 is directed toward an uppermost point 329 of the inducer edge 325 and the pinch profile 565 of the base component 560 is directed toward a lowermost point 327 of the inducer edge 325. As indicated, each of the pinch profiles 515 and 565 may be characterized by a slope or respective slopes (see, e.g., $\Delta z/\Delta r$). As an example, the pinch profile of the pinch 565 may have a slope of about zero (e.g., no change in z-direction with respect to the r-direction at or near an edge of the base component 560).

FIG. 5 also shows the turbine wheel 300 as including a z-plane along its base plate 310. Further, the base component 560 includes an annular surface 566 disposed at a radius from the z-axis that is greater than the maximum radius of the base plate 310 of the turbine wheel 300. As shown, the pinch profile 565 extends from the substantially planar surface 562 to an edge 567, which extends axially downward; while the pinch profile 515 extends from the substantially planar surface 512 to a minimum axial position 517 and then to a shroud surface 516 (e.g., that provides a clearance with respect to the shroud edge 346 of the blade 320).

Also shown in the example of FIG. 5 is a post 590 that acts to locate the insert component 510 with respect to the base component 560 of the pinched nozzle cartridge 500 as well as an opening 561 in the base component 560, for example, for receipt of a vane post (see, e.g., the vane post 410 of the vane 400 of FIG. 2). In the example of FIG. 5, the pinch profile 515 and the pinch profile 565 are positioned in a manner that does not interfere with orientating a vane disposed between the substantially planar surfaces 512 and 562. For example, the pinch profiles 515 and 565 are located in a manner that does not diminish axial height of the nozzle section 212 that would inhibit pivoting of a vane about its vane post as disposed in the opening 561 of the base component 560 of the pinched nozzle cartridge 500. In the example of FIG. 5, a vane axis is shown with respect to the opening 561, which may be positioned a radial distance from the nozzle 215 (e.g., the pinch profiles 515 and 565) to accommodate vanes having dimensions and associated orientations (e.g., fully open, fully closed, etc.).

Figure 6:
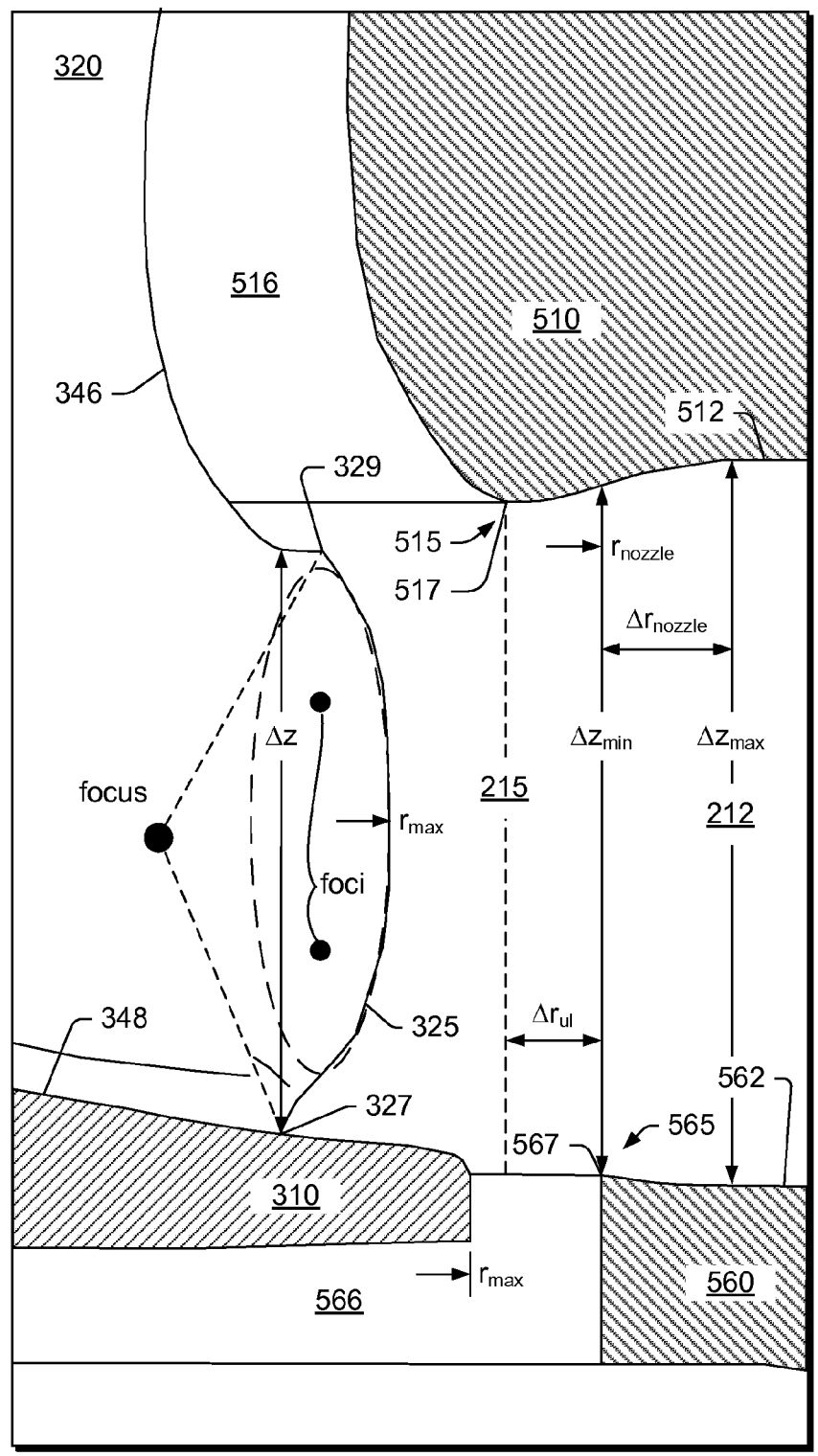
FIG. 6 is a cutaway view of an example of a turbine wheel and a pinched nozzle formed by a pinched nozzle cartridge.

FIG. 6 shows an enlarged cutaway view of the example of the assembly of FIG. 5 along with various dimensions. As shown, the nozzle section 212 includes an axial dimension $\Delta z_{max}$ that transitions to an axial dimension $\Delta z_{min}$, which does not correspond to the minimum axial position 517 of the pinch profile 515. Accordingly, the nozzle 215 may be defined as having an axial dimension based on the minimum axial position 517 of the pinch profile 515 and an axial position of the edge 567 associated with the pinch profile 565, which are shown as being displaced by a radial distance $\Delta r_{ul}$. Thus, a line connecting the position 517 and the edge 567 may be at an angle with respect to a rotational axis of a turbine wheel (e.g., or an axis of the surface 566 and the surface 516 of the pinched nozzle cartridge 500).

In the example of FIG. 6, the inducer edge 325 is shown as extending between the lowermost point 327 and the uppermost point 329 (e.g., along the z-axis). The inducer edge 325 may be defined with respect to a focus, foci, etc., as having a profile (e.g., a contour). For example, the inducer edge 325 may be defined at least in part by a portion of an ellipse (see, e.g., foci, which may define a major axis and a minor axis of an ellipse). As an example, a turbine wheel may be described as including an inducer edge with a bionic shape.

While the example of FIG. 6 shows the insert component 510 as including the pinch profile 515 and the base component 560 as including the pinch profile 565, as an example, an assembly may include a single pinch profile (e.g., the pinch profile 515 or the pinch profile 565). As an example, an assembly may include an upper pinch profile of a nozzle section where the pinch profile directs exhaust from vane throats to an inducer portion of a turbine wheel. In various examples, an assembly may include a turbine wheel with an inducer edge that has an axial height (e.g., as measured with respect to a rotational axis of the turbine wheel) that is less than an axial height of a nozzle, for example, a pinched nozzle formed by a pinched nozzle cartridge or two components where at least one of the components includes a pinch profile extending axially downwardly and radially inwardly from a planar nozzle section (e.g., that accommodates vanes).

As an example, an inducer edge may include one or more curved portions and a substantially straight portion. As an example, an upper portion of an inducer edge may be curved (e.g., consider the elliptical shape of FIG. 6) while a lower portion extends from a maximum radius downward axially to a base plate of a turbine wheel. In such an example, a nozzle may include an upper pinch to form a pinched nozzle while a lower surface of the nozzle is substantially flat and planar (e.g., as in a nozzle section that accommodates vanes).

Figure 7:
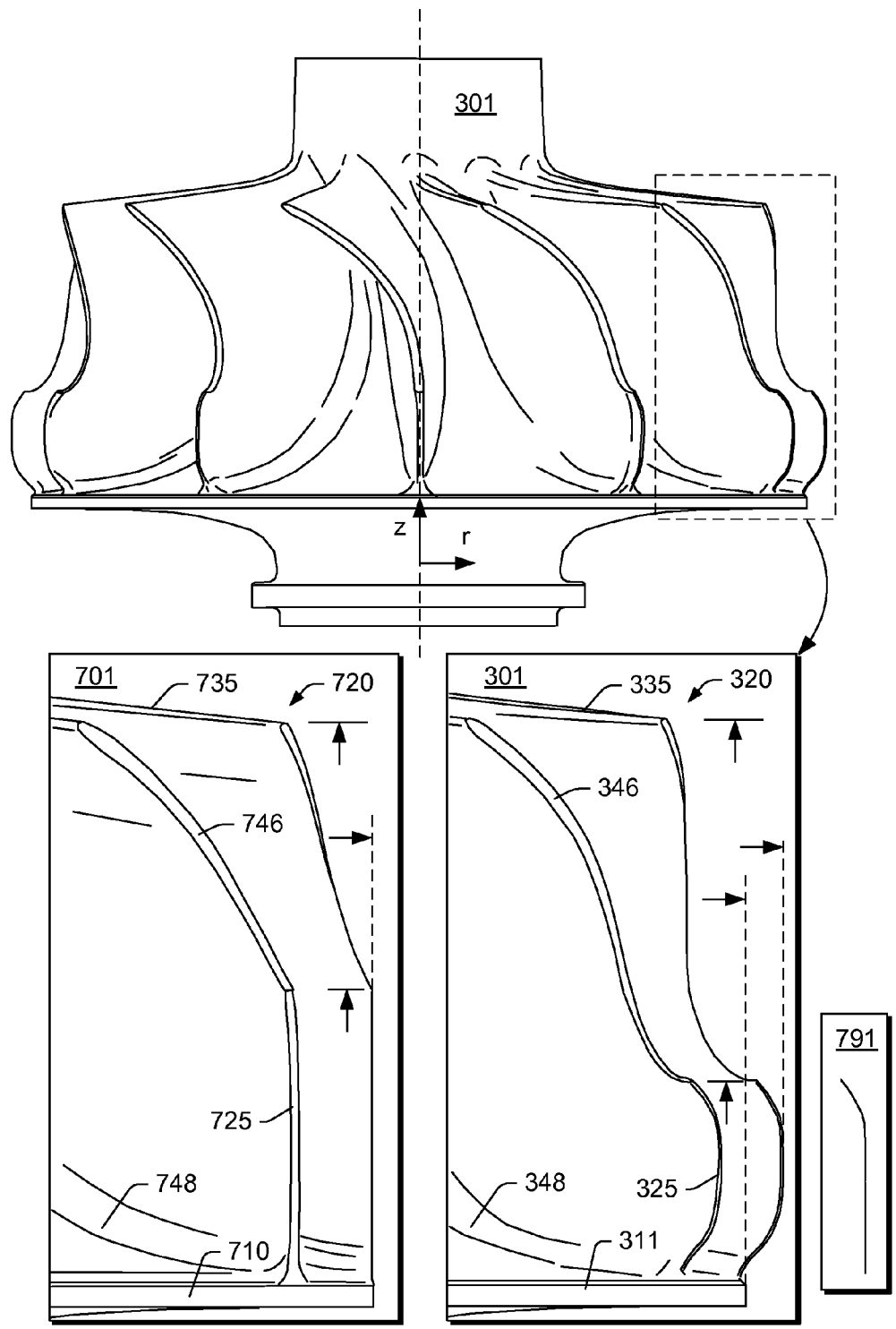
FIG. 7 is a series of views of examples of a turbine wheel.

FIG. 7 shows a side view of an example of a turbine wheel 301, an enlarged side view of a turbine wheel 701 and an enlarged side view of the turbine wheel 301. In the example of FIG. 7, the turbine wheel 301 includes a base plate 311 that does not extend radially to the maximum radial dimension of the inducer edge 325. In contrast, the base plate 310 of the turbine wheel 300 as shown in FIG. 5 extends radially to the maximum radial dimension of the inducer edge 325 and actually radially beyond the maximum radial dimension of the inducer edge 325. As an example, a base plate may be configured to provide an angled profile that leads to a lowermost point of an inducer edge of a blade (see, e.g., the example of FIG. 5). As an example, a base plate may be configured for purposes of stress. As an example, a base plate may be configured for purposes of mass, clearance with respect to an opening defined by a base component of a pinched nozzle cartridge, etc.

As to the turbine wheel 701, it includes a base plate 710, an inducer edge 725, an exducer edge 735, a shroud edge 746 and a hub edge 748. A comparison between the turbine wheel 301 and the turbine wheel 701 shows that the inducer edge 325 is, with respect to overall blade height, a smaller fraction than the inducer edge 725. For example, the inducer edge 725 is about 50% of the overall blade height; whereas, the inducer edge 325 is about 30% of the overall blade height.

As mentioned, as an example, an inducer edge may include one or more curved portions and a straight portion (e.g., or straight portions). For example, in FIG. 7, an inducer edge 791 can include an upper portion as in the inducer edge 325 and a lower portion as in the inducer edge 725. In such an example, a nozzle may be defined by an upper pinch profile and optionally a lower flat, planar profile. In such an example, the turbine wheel may include a base plate such as the base plate 710 (e.g., that extends to the lowermost point of the inducer edge).

Figure 8:
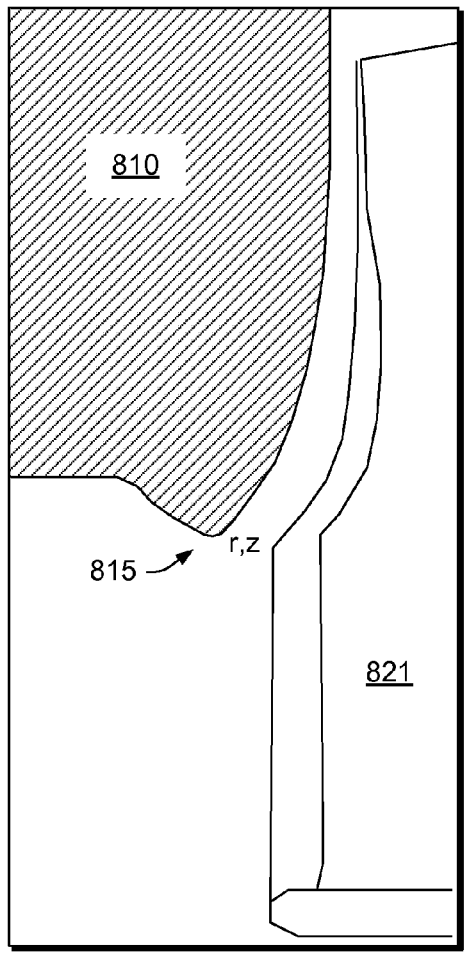
FIG. 8 is a series of views of examples of assemblies and components.
Figure 8:
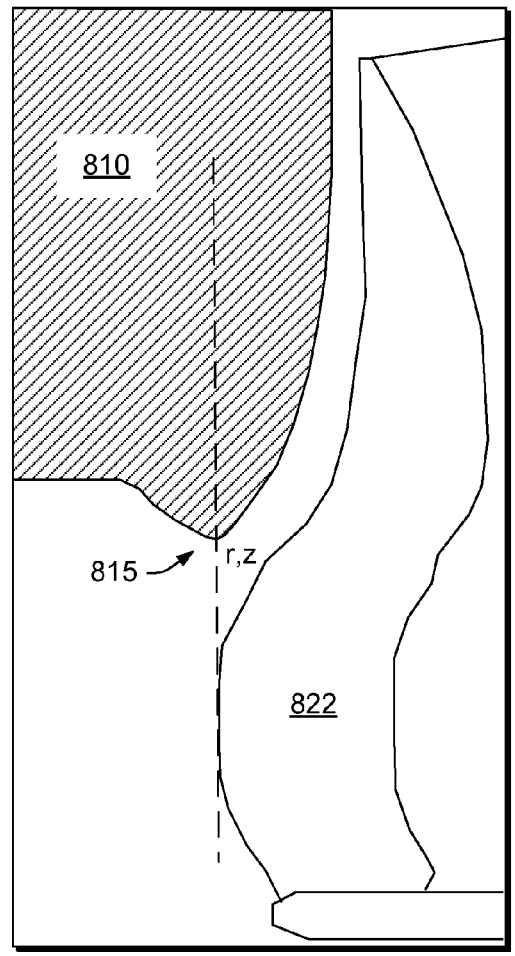
Figure 8:
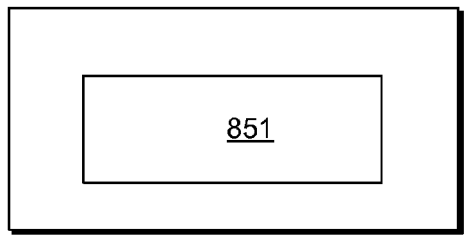
Figure 8:
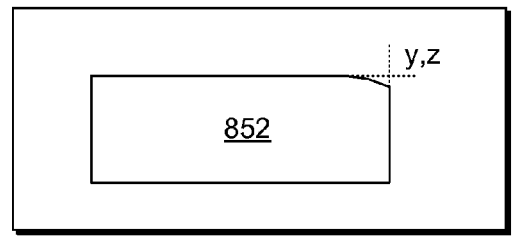

FIG. 8 shows an example of an assembly 801, an assembly 802, a vane 851 and a vane 852. As shown, the assemblies 801 and 802 include a component 810 that includes a pinch profile 815 while the assembly 801 includes a wheel 821 and the assembly 802 includes a wheel 822. Where the assemblies 801 and 802 include vanes, a vane may include a profile such as the vane 851 or a profile such as the vane 852. As shown, the vane 852 includes a chamfer at the trailing edge, which may provide clearance with respect to a pinch such as the pinch 815 of the assembly 801 or the assembly 802. As an example, a pinch profile may provide a so-called $B_{width}$ that is less than a vane height, for example, as defined by a cartridge that can carry vanes (e.g., a cartridge of a variable geometry unit). As an example, the vane 852 may be defined with respect to a coordinate system, for example, where the chamfer may be sloped with respect to a y dimension and a z dimension. As an example, a vane may include an upper chamfer and a lower chamfer, for example, to provide clearances with respect to an upper pinch profile and a lower pinch profile.

As an example, for a turbocharger that includes a variable geometry unit that includes vanes, the unit may be configured such that the vanes stop in maximum open position at or near a start of a pinch profile (e.g., at or near the end of a flat surface). As an example, depending on clearance, slope, etc., vanes may overlap with a portion of a pinch profile. As mentioned, a vane may optionally include a chamfer or other feature at a trailing edge, for example, to allow for overlap with a reduced risk of contact (e.g., sticking, wear, etc.).

As an example, a pinch may provide for increased low end efficiency, for example, where vanes are in a minimum open position (e.g., "closed"). In such an example, high end flow capacity may be preserved, for example, where the vanes and/or the pinch profile are configured to allow the vanes to reach a maximum open position. In other words, if a pinch profile diminishes an ability to open vanes, then the pinch profile may detract from a high end of an operational range of a turbocharger.

As an example, a pinch may be positioned such that a vane maximum open position compared to a wheel is akin to vane interaction to the pinch. As an example, a soft stop REA (e.g., about 2° off a hard stop), may act to avoid contact with a pinch (e.g., after REA calibration), for example, to avoid wear, sticking, etc. As an example, boost margin may be maintained, in comparison to an assembly without a pinch, where the vane maximum open REA position is maintained. As an example, a pinch may enhance low end performance of a turbocharger.

As an example, a method may set a minimum flow vane position and/or a maximum flow vane position by using a calibrated turbine flow bench that may, for example, measure airflow through vanes. Such a bench may also allow for setting and locking a flow position or flow positions to suit a particular application. As an example, once a minimum vane open position is set, calibration of a vane actuator may occur (e.g., to OEM specification, etc.).

As an example, where a turbocharger includes a variable geometry unit, at low engine speed and low gas flow, vanes of the unit may be moved to a "closed" position to reduce inlet area to a turbine wheel to thereby increase exhaust inlet pressure to the turbine wheel, which can enhance turbine power and drive higher engine boost pressure. As an example, at full engine speed and load and high gas flow, vanes of a variable geometry unit may be opened, for example, to increase inlet area and thereby to help prevent over-boost (e.g., and reduce engine outlet pressure, which may help to improve fuel economy).

As an example, a turbocharger can include a turbine assembly that includes a pinch section that causes exhaust to flow at an incidence angle with respect to blades of a turbine wheel. In such an example, the pinch section may improve performance of the turbocharger at a low end (e.g., improve torque, responsiveness, etc.). For example, where about 4,000 rpm may be a high end, about 1,000 rpm may be a low end (e.g., in a range of rpms that may extend from idle to about 500 rpm to about 1,000 rpm above idle).

As an example, an axial height of an inducer edge may be selected based on one or more dimensions of a pinched nozzle cartridge. Further, as an example, a radial dimension of an inducer edge may be greater than a maximum radial dimension of a base plate of a turbine wheel.

As an example, an inducer edge may include a smaller axial height to improve incidence angle. As an example, an exducer edge maximum diameter may be extended by about a millimeter or more (e.g., about 2 mm). As an example, an assembly may include vanes where the vanes are configured to maintain a gap between each of the vanes and an inducer edge of a turbine wheel at a fully open position of the vanes.

As an example, a pinched nozzle may improve efficiency and a turbine wheel that includes a curved inducer edge may improve efficiency. As an example, a pinched nozzle and curved inducer edges of a turbine wheel may be configured to achieve desired flow characteristics of exhaust from vane throats to the pinched nozzle and to the turbine wheel (e.g., that enhance low flow performance of a turbocharger). In such an example, the configuration of the assembly may improve performance of a turbocharger and hence an internal combustion engine. In such an example, the pinched nozzle (and optionally the curved inducer edges of the turbine wheel) may be configured based at least in part on a fully open position for vanes adjustable by a variable geometry mechanism. For example, a pinch profile of a nozzle section may commence at a radial position that does not interfere with opening of the vanes (e.g., pivoting of the vanes) to a desired orientation (e.g., fully open orientation). As an example, an assembly may be defined with respect to one or more dimensions of a turbine wheel (e.g., to define vane position, pinch angle, etc.).

As an example, pinching of a nozzle may act to accelerate flow into an inducer portion of a turbine wheel, for example, while directing the flow slightly towards a hub line of the turbine wheel (see, e.g., hub and hub edge of blades). In such an example, flow at the hub line may be more efficient than at the shroud.

As an example, a profile of a turbine wheel may allow the wheel tip as part of an inducer edge to be extended towards a nozzle, for example, without overly increasing inertia (e.g., with extension of a back plate of the turbine wheel). As an example, closer positioning of the inducer edge to the nozzle may provide for more efficiency. In such an example, curvature of the leading edges (inducer edges) of the turbine wheel blades may be beneficial.

As an example, an assembly may include nozzle sizing and vane pivot positioning that provide for opening vanes as close to a turbine wheel (e.g., inducer edge of blade) as possible to maintain flow and maximize range (e.g., noting that extending a wheel tip into a nozzle may risk limiting opening and reducing range).

As an example, an assembly for a turbocharger can include a pinched nozzle cartridge that includes a base component, an insert component and vanes disposed at least in part between the base component and the insert component, where the insert component includes a shroud surface and an upper pinch profile, where the base component includes an annular surface that defines a turbine wheel opening and a lower profile and where the upper pinch profile and the lower profile form a pinched nozzle.

As an example, an assembly may include vanes that have a minimum open position and a maximum open position. In such an example, for the maximum open position of the vanes, the vanes may not contact a pinch profile of an insert component. As an example, for a maximum open position of the vanes, trailing edges of the vanes may overlap with a pinch profile of an insert component. As an example, each vane of an assembly that includes vanes may include a trailing edge chamfer that defines a clearance between each of the vanes and a pinch profile of an insert component.

As an example, a pinched nozzle may be defined by an upper pinch profile, a lower pinch profile or an upper and lower pinch profile.

As an example, an assembly may include a turbine wheel received via a turbine wheel opening of a base component where for a minimum open position of vanes, a pinch profile defined in part by an insert component directs exhaust passing through throats defined by the vanes axially downwardly toward leading edges of blades of the turbine wheel.

As an example, an assembly may include, disposed in a pinched nozzle cartridge via a turbine wheel opening, a turbine wheel that includes a rotational axis, a hub and a plurality of blades that extend radially outwardly from the hub where each of the blades includes a shroud edge and an inducer edge defined between an upper axial point and a lower axial point and where an upper pinch profile of an insert component includes a downward angle directed at the upper axial point of the inducer edge. In such an example, a lower profile of a base component may include a lower pinch profile that includes an upward angle directed at the lower axial point of the inducer edge.

As an example, an assembly may include a turbine wheel that includes inducer edges where each of the inducer edges of the turbine wheel includes a scalloped edge. In such an example, each of the scalloped edges may include a maximum radius that exceeds a radius of an upper axial point of the inducer edge and that exceeds a radius of a lower axial point of the inducer edge.

As an example, where an assembly includes vanes, each of the vanes may include a leading edge and a trailing edge where, for a fully open orientation of the vanes, the trailing edges are displaced a radial distance from a pinched nozzle. In such an example, the radial distance may corresponds to a nozzle section of a pinched nozzle cartridge defined by substantially planar and parallel surfaces of an insert component and a base component.

As an example, an assembly may include a turbine housing that defines, in part, a volute. As an example, an insert component may include a radial end that extends into a volute. As an example, an assembly may include a seal element disposed between an insert component and a turbine housing.

As an example, an assembly may include a base component that is axially located between two components, for example, where one of the components applies a load to the base component.

As an example, a turbocharger can include a center housing that includes a through bore (e.g., that defines a through bore); a compressor housing coupled to the center housing; a turbine housing coupled to the center housing; a bearing disposed in the bore of the center housing; a shaft and turbine wheel assembly rotatably supported by the bearing in the bore of the center housing; a compressor wheel coupled to the shaft and turbine wheel assembly; and a pinched nozzle cartridge that includes a base component, an insert component and vanes disposed at least in part between the base component and the insert component, where the insert component includes a shroud surface and an upper pinch profile, where the base component includes an annular surface that defines a turbine wheel opening and a lower profile and where the upper pinch profile and the lower profile form a pinched nozzle. In such an example, the turbine wheel can include a rotational axis, a hub and a plurality of blades that extend radially outwardly from the hub where each of the blades includes a shroud edge and an inducer edge defined between an upper axial point and a lower axial point and where the upper pinch profile includes a downward angle directed at the upper axial point of the inducer edge. In such an example, each of the inducer edges of the turbine wheel may include a scalloped edge.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. An assembly for a turbocharger comprising:
   a pinched nozzle cartridge that comprises a base component, an insert component and vanes disposed at least in part between the base component and the insert component,
   wherein the insert component comprises a shroud surface and an upper pinch profile,
   wherein the base component comprises an annular surface that defines a turbine wheel opening and a lower profile,
   wherein the upper pinch profile and the lower profile form a pinched nozzle,
   wherein the vanes comprise a minimum open position and a maximum open position, and
   wherein for the maximum open position of the vanes, trailing edges of the vanes overlap with the pinch profile.

2. The assembly of claim 1 wherein for the maximum open position of the vanes, the vanes do not contact the pinch profile of the insert component.

3. The assembly of claim 1 wherein each of the vanes comprises a trailing edge chamfer that defines a clearance between each of the vanes and the pinch profile.

4. The assembly of claim 1 wherein the lower profile comprises a pinch profile.

5. The assembly of claim 1 further comprising a turbine wheel received via the turbine wheel opening of the base component wherein for the minimum open position of the vanes, the pinch profile directs exhaust passing through throats defined by the vanes axially downwardly toward leading edges of blades of the turbine wheel.

6. The assembly of claim 1 further comprising, disposed in the pinched nozzle cartridge via the turbine wheel opening, a turbine wheel that comprises a rotational axis, a hub and a plurality of blades that extend radially outwardly from the hub wherein each of the blades comprises a shroud edge and an inducer edge defined between an upper axial point and a lower axial point and wherein the upper pinch profile comprises a downward angle directed at the upper axial point of the inducer edge.

7. The assembly of claim 6 wherein the lower profile comprises a lower pinch profile that comprises an upward angle directed at the lower axial point of the inducer edge.

8. The assembly of claim 6 wherein each of the inducer edges of the turbine wheel comprises a scalloped edge.

9. The assembly of claim 8 wherein the scalloped edge comprises a maximum radius that exceeds a radius of the upper axial point and that exceeds a radius of the lower axial point.

10. The assembly of claim 1 further comprising a turbine housing that defines, in part, a volute.

11. The assembly of claim 10 wherein the insert component comprises a radial end that extends into the volute.

12. The assembly of claim 10 wherein a seal element is disposed between the insert component and the turbine housing.

13. The assembly of claim 1 wherein the base component is axially located between two components wherein one of the components applies a load to the base component.

14. A turbocharger comprising:
a center housing that comprises a through bore;
a compressor housing coupled to the center housing;
a turbine housing coupled to the center housing;
a bearing disposed in the bore of the center housing;
a shaft and turbine wheel assembly rotatably supported by the bearing in the bore of the center housing;
a compressor wheel coupled to the shaft and turbine wheel assembly; and
a pinched nozzle cartridge that comprises a base component, an insert component and vanes disposed at least in part between the base component and the insert component,
wherein the insert component comprises a shroud surface and an upper pinch profile and/or wherein the base component comprises an annular surface that defines a turbine wheel opening and a lower profile and
wherein the upper pinch profile and/or the lower profile form a pinched nozzle,
wherein the vanes comprise a minimum open position and a maximum open position, and
wherein for the maximum open position of the vanes, trailing edges of the vanes overlap with the pinch profile.

15. The turbocharger of claim 14 wherein the turbine wheel comprises a rotational axis, a hub and a plurality of blades that extend radially outwardly from the hub wherein each of the blades comprises a shroud edge and an inducer edge defined between an upper axial point and a lower axial point and wherein the upper pinch profile comprises a downward angle directed at the upper axial point of the inducer edge.

16. The turbocharger of claim 15 wherein the each of the inducer edges of the turbine wheel comprises a scalloped edge.

17. The turbocharger of claim 14 wherein each of the vanes comprises a trailing edge chamfer that defines a clearance between each of the vanes and the pinch profile.

18. An assembly for a turbocharger comprising:
a pinched nozzle cartridge that comprises a base component, an insert component and vanes disposed at least in part between the base component and the insert component,
wherein the insert component comprises a shroud surface and an upper pinch profile,
wherein the base component comprises an annular surface that defines a turbine wheel opening and a lower profile and
wherein the upper pinch profile and the lower profile form a pinched nozzle; and
further comprising, disposed in the pinched nozzle cartridge via the turbine wheel opening, a turbine wheel that comprises a rotational axis, a hub and a plurality of blades that extend radially outwardly from the hub wherein each of the blades comprises a shroud edge and an inducer edge defined between an upper axial point and a lower axial point and wherein the upper pinch profile comprises a downward angle directed at the upper axial point of the inducer edge,
wherein each of the inducer edges of the turbine wheel comprises a scalloped edge, and
wherein the scalloped edge comprises a maximum radius that exceeds a radius of the upper axial point and that exceeds a radius of the lower axial point.

* * * * *